US008359869B2

(12) United States Patent
Wright

(10) Patent No.: US 8,359,869 B2
(45) Date of Patent: Jan. 29, 2013

(54) METHOD AND SYSTEMS FOR ADAPTIVE IGNITION ENERGY

(75) Inventor: Scott Brian Wright, Ponte Vedra Beach, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/585,005

(22) Filed: Aug. 14, 2012

(65) Prior Publication Data

US 2012/0312025 A1 Dec. 13, 2012

Related U.S. Application Data

(62) Division of application No. 12/342,801, filed on Dec. 23, 2008, now Pat. No. 8,266,885.

(51) Int. Cl.
*F02C 1/00* (2006.01)

(52) U.S. Cl. ....................................... 60/772; 60/39.821

(58) Field of Classification Search .. 60/39.821–39.824, 60/39.827, 772; 361/155, 156, 253–256, 361/263; 315/209 CD, 209 M, 209 PZ; 307/10.6
See application file for complete search history.

(56) References Cited

U.S. PATENT DOCUMENTS

| | | | | |
|---|---|---|---|---|
| 3,714,507 | A * | 1/1973 | Schweitzer et al. | ... 315/209 CD |
| 4,088,109 | A | 5/1978 | Woodruff et al. | |
| 4,606,719 | A | 8/1986 | Mori et al. | |
| 4,667,645 | A | 5/1987 | Gluckman | |
| 4,696,280 | A | 9/1987 | Niggemeyer | |
| 4,983,886 | A | 1/1991 | Balland | |
| 5,030,883 | A * | 7/1991 | Bonavia | .......................... 315/56 |
| 5,224,015 | A | 6/1993 | Balland | |
| 5,245,252 | A | 9/1993 | Frus et al. | |
| 5,469,824 | A | 11/1995 | Fontenla | |
| 5,508,618 | A | 4/1996 | Owens | |
| 5,510,952 | A | 4/1996 | Bonavia et al. | |
| 5,561,350 | A | 10/1996 | Frus et al. | |
| 6,603,216 | B2 | 8/2003 | Costello | |
| 6,775,988 | B2 | 8/2004 | Willems | |
| 7,322,197 | B2 | 1/2008 | Kudrna et al. | |
| 7,355,300 | B2 | 4/2008 | Wilmot et al. | |
| 2008/0071461 | A1 | 3/2008 | Kudrna et al. | |

FOREIGN PATENT DOCUMENTS

| | | |
|---|---|---|
| EP | 0362014 A1 | 4/1990 |
| EP | 0601460 A2 | 6/1994 |

OTHER PUBLICATIONS

International Search Report for copending PCT patent application No. PCT/US2009/066261, issued Mar. 8, 2010.

* cited by examiner

*Primary Examiner* — Phutthiwat Wongwian
(74) *Attorney, Agent, or Firm* — David J. Clement, Esq.; Armstrong Teasdale LLP

(57) ABSTRACT

A method and systems for an engine igniter excitation system includes an energy storage device, a first adaptive comparator configured to control the storage of an amount of energy in the energy storage device wherein the amount of energy is determined using at least one of an environmental parameter of the engine and a process parameter of the engine. The system also includes a second adaptive comparator communicatively coupled to the energy storage device wherein the second adaptive comparator is configured to control a rate of energy delivery to the energy storage device using at least one of an environmental parameter of the engine and a process parameter of the engine. The system also includes an igniter configured to generate a spark based on the amount of stored energy and the rate of energy delivery.

9 Claims, 2 Drawing Sheets

METHOD AND SYSTEMS FOR ADAPTIVE IGNITION ENERGY

CROSS REFERENCE TO RELATED APPLICATIONS

This application is a division of application Ser. No. 12/342,801, filed Dec. 23, 2008 now U.S. Pat. No. 8,266,885, which is hereby incorporated by reference in it's entirety.

BACKGROUND OF THE INVENTION

This invention relates generally to operating gas turbine engines and, more particularly, to a method and systems for providing adaptive ignition for increased stored energy or spark rate at low ambient temperatures.

Ignition system energy requirements for at least some known engines are specified to ensure sufficient energy delivery for all worst case starting scenarios (for example, at cold temperature). This typically means that the system is delivering more energy than necessary during optimal engine starting conditions. Specifying worst case energy requirements for an engine ignition system means that the ignition system is delivering more energy than necessary during optimal (room temperature or higher) engine starting conditions, and that this higher delivered energy (and thus stored energy) imposes a weight penalty on the ignition exciter due to large size and increased weight tank capacitors. This increased energy also has an adverse effect on the exciter tank capacitor life due to increased electrical stress, and igniter plug life due to increased erosion from higher sparking energies. Implementing circuits that simply increase power conversion of the energy storage system, or permit increased energy storage before triggering the ignition spark event during cold temperature conditions are not sufficient as each of these parameters (stored energy and spark rate) have been proven to be critical to successful engine starting. Also, the optimal implementation would permit a reduced delivered energy and spark rate operational mode for typical engine starting performance during room temperature or hot conditions.

BRIEF DESCRIPTION OF THE INVENTION

In one embodiment, an engine igniter excitation system includes an energy storage device, a first adaptive comparator configured to control the storage of an amount of energy in the energy storage device wherein the amount of energy is determined using at least one of an environmental parameter of the engine and a process parameter of the engine. The system also includes a second adaptive comparator communicatively coupled to the energy storage device wherein the second adaptive comparator is configured to control a rate of energy delivery to the energy storage device using at least one of an environmental parameter of the engine and a process parameter of the engine. The system also includes an igniter configured to generate a spark based on the amount of stored energy and the rate of energy delivery.

In another embodiment, an engine includes a combustor, an igniter plug operatively coupled to the combustor, and an engine igniter excitation system. The engine igniter excitation system is configured to deliver a spark impulse to the igniter plug. The engine igniter excitation system includes an energy storage device, a first adaptive comparator configured to control the storage of an amount of energy in the energy storage device, the amount of energy determined using at least one of an environmental parameter of the engine and a process parameter of the engine, and a second adaptive comparator communicatively coupled to the energy storage device, the second adaptive comparator configured to control a rate of energy delivery to the energy storage device using at least one of an environmental parameter of the engine and a process parameter of the engine.

In yet another embodiment, a method of igniting fuel in a combustor of an engine using an igniter plug includes determining at least one of an environmental and an operational parameter of the engine, controlling an amount of energy stored in an energy storage device using the determined parameter of the engine, controlling a spark rate delivered to the igniter plug using the determined parameter of the engine, and outputting a spark impulse to the igniter plug to generate a spark.

BRIEF DESCRIPTION OF THE DRAWINGS

FIG. 1 is a schematic view of an exemplary gas turbine engine that includes a core engine section positioned axially downstream from a fan section along a longitudinal axis; and FIG. 2 is a schematic block diagram of an adaptive engine ignition system in accordance with an exemplary embodiment of the present invention.

DETAILED DESCRIPTION OF THE INVENTION

The following detailed description illustrates embodiments of the invention by way of example and not by way of limitation. It is contemplated that the invention has general application to embodiments of adaptive ignition excitation systems, apparatus and methods in industrial, commercial, and residential applications.

As used herein, an element or step recited in the singular and proceeded with the word “a” or “an” should be understood as not excluding plural elements or steps, unless such exclusion is explicitly recited. Furthermore, references to “one embodiment” of the present invention are not intended to be interpreted as excluding the existence of additional embodiments that also incorporate the recited features.

Figure 1:
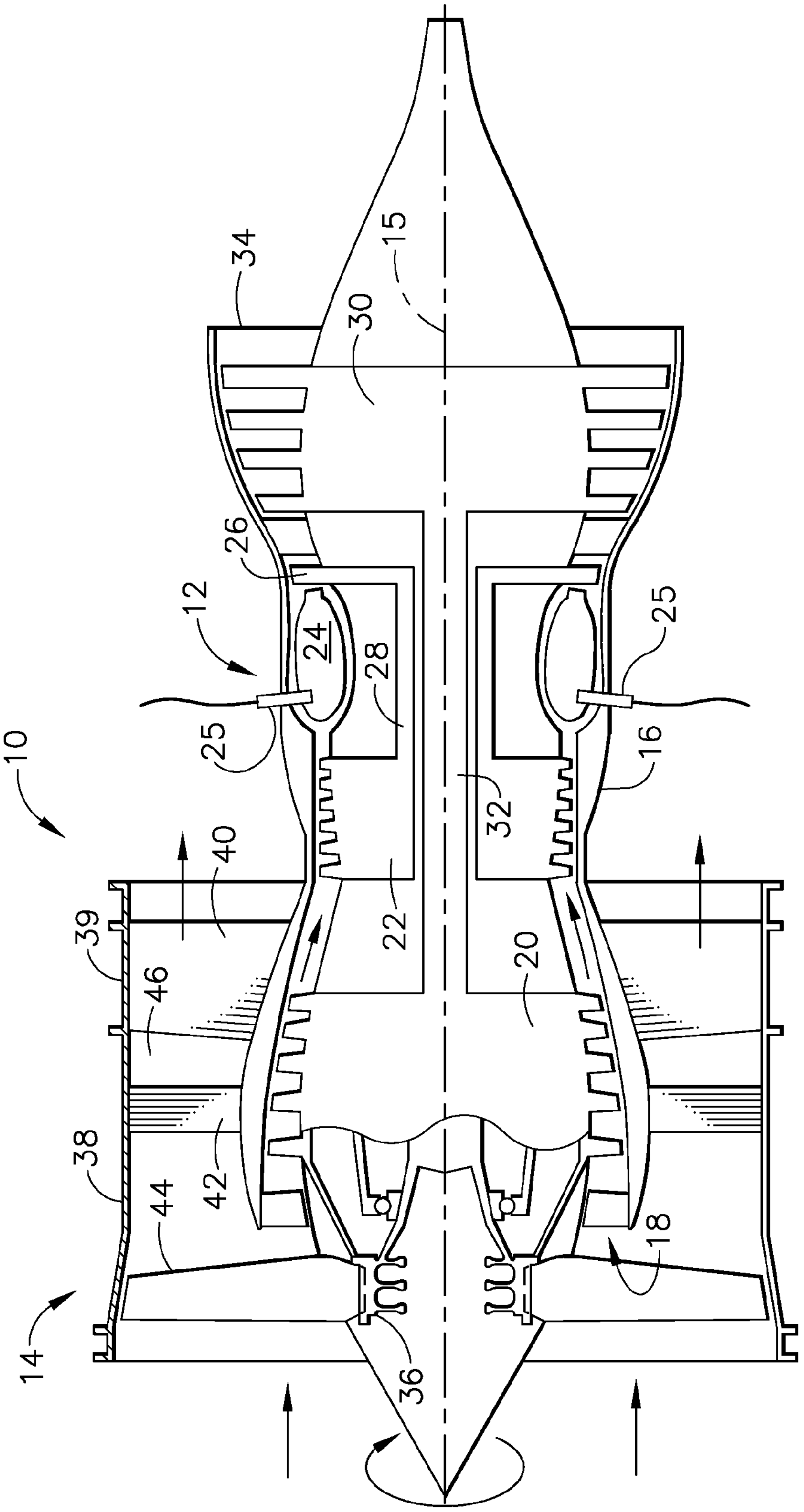
FIGS. 1 and 2 show exemplary embodiments of the method and systems described herein.

FIG. 1 is a schematic view of an exemplary gas turbine engine 10 that includes a core engine section 12 positioned axially downstream from a fan section 14 along a longitudinal axis 15. Core engine section 12 includes a generally tubular outer casing 16 that defines an annular core engine inlet 18 and that encloses and supports a pressure booster 20 for use in raising the pressure of the air that enters core engine section 12 to a first pressure level. A high pressure, multi-stage, axial-flow compressor 22 receives pressurized air from booster 20 and further increases the pressure of the air. The pressurized air flows to a combustor 24 where fuel is injected into the pressurized air stream to raise the temperature and energy level of the pressurized air. An igniter plug 25 may be used to facilitate initiating combustion of the fuel air mixture in combustor 24. The high energy combustion products flow to a first turbine 26 for use in driving compressor 22 through a first drive shaft 28, and then to a second turbine 30 for use in driving booster 20 through a second drive shaft 32 that is coaxial with first drive shaft 28. After driving each of turbines 26 and 30, the combustion products are channeled from core engine section 12 through an exhaust nozzle 34 to provide propulsive jet thrust.

Fan section 14 includes a rotatable, axial-flow fan rotor 36 that is surrounded by an annular fan casing 38. Fan casing 38 is supported about core engine section 12 by a plurality of substantially radially-extending, circumferentially-spaced support struts 40. Fan casing 38 is supported by radially-extending outlet guide vanes 42 and encloses fan rotor 36 and a plurality of fan rotor blades 44. Downstream section 39 of fan casing 38 extends over an outer portion of core engine 12 to define a secondary, or bypass, airflow conduit 46 that provides additional propulsive jet thrust.

Figure 2:
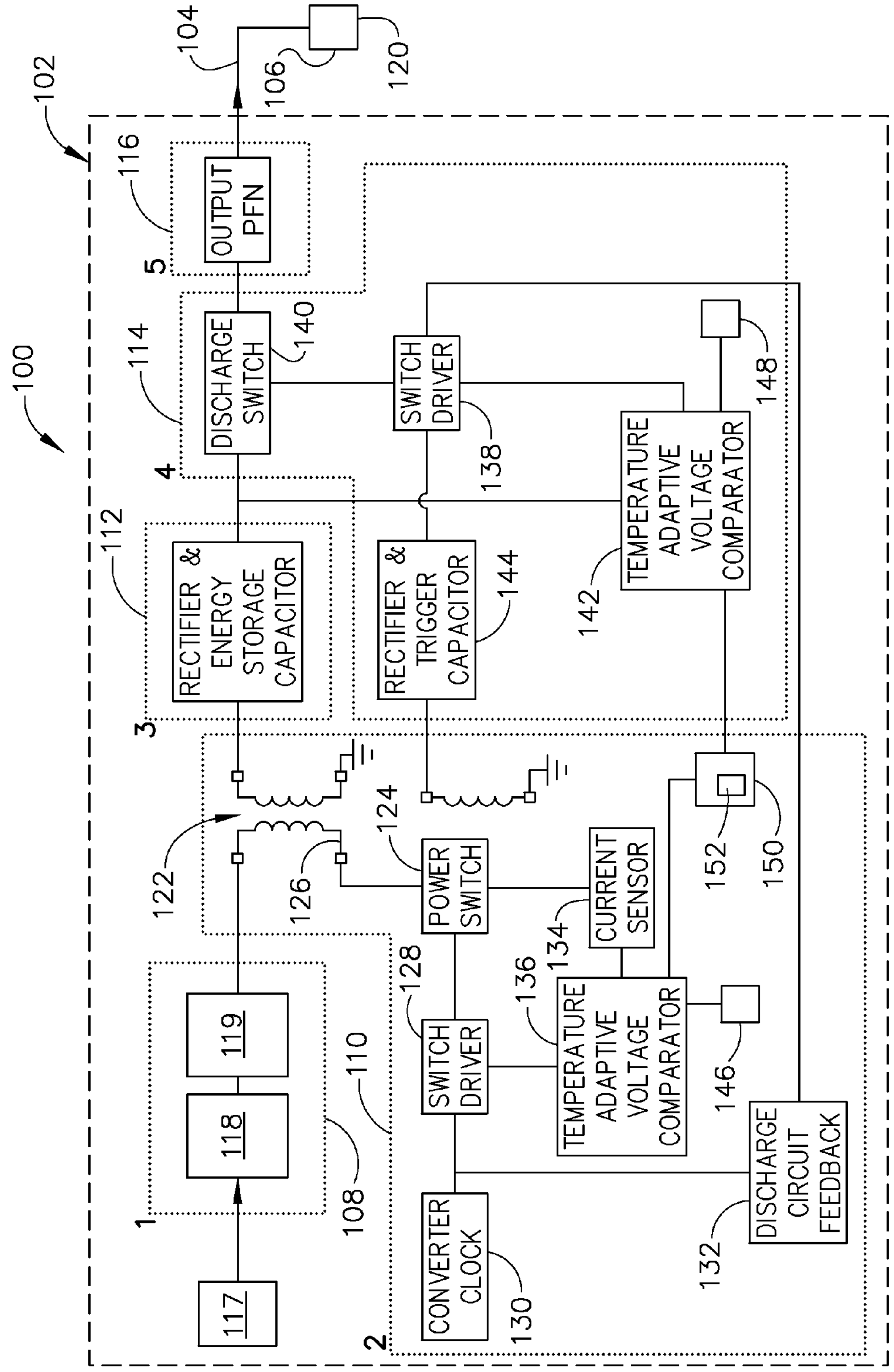

FIG. 2 is a schematic block diagram of an adaptive engine ignition system 100 in accordance with an exemplary embodiment of the present invention. In the exemplary embodiment, adaptive engine ignition system 100 includes an ignition exciter circuit 102, an ignition lead 104, and an igniter plug 106. Ignition exciter circuit 102 comprises an electronic unit that includes an EMI filter 108, a power converter 110, an energy storage or "tank" capacitor 112, a voltage monitoring circuit and discharge switch module 114, and a pulse forming network (PFN) 116. EMI filter 108 is configured to receive a supply of relatively low direct current (DC) voltage, for example, 28 volts DC from a DC source 117, for example, an aircraft electrical power system. EMI filter 108 includes an EMI filter 118 and a smoothing capacitor 119 configured to prevent high frequency noise generated by ignition exciter circuit 102 from escaping via the DC power input and to protect power converter 110 from transients present on DC source 117. In the exemplary embodiment, power converter 110 comprises a "flyback" type converter and is configured to step up an input voltage received from EMI filter 108 to an optimal level for energy storage. Power converter 110 utilizes a charge pump technique to build up the voltage at the energy storage device over a number of charge cycles. When the charge cycles have built the voltage at capacitor 112 to a predetermined level, the charge pumping is interrupted, and capacitor 112 is controlled to discharge. In an alternative embodiment, power converter 110 is a DC-DC converter other than a flyback type converter. Energy storage or "tank" capacitor 112 is configured to store energy between sparking events. Voltage monitoring circuit and discharge switch module is configured to release the energy stored in tank capacitor 112. PFN 116 is configured to optimize the shape and timing of the stored energy waveform for creating the spark at a tip 120 of igniter plug 106. Ignition lead 104 transmits an output of ignition exciter circuit 102 to igniter plug 106. Igniter plug 106 conducts the energy from ignition lead 104 to firing tip 120 residing within an engine combustor (not shown). A geometry of firing tip 120 is configured to provide a predetermined spark plume within the combustor to ignite a fuel and air mixture, thus initiating combustion. The actual energy delivered at the igniter tip (delivered energy) is a percentage of the internal exciter stored energy (typically 25-35%). The energy contained within the spark plume, as well as the rate at which sparks are delivered to the combustor (spark rate), are ignition parameters.

Power converter 110 includes a transformer 122, a power switch 124 electrically coupled to a primary winding 126 of transformer 122. Power converter 110 also includes a first switch driver 128 electrically coupled to power switch 124. A converter clock 130 and a discharge feedback circuit 132 are electrically coupled to switch driver 128. A current sensor 134 is electrically coupled to power switch 124 and a first temperature adaptive voltage comparator 136.

Voltage monitoring circuit and discharge switch module 114 includes a second switch driver 138 electrically coupled to a discharge switch 140, a second temperature adaptive voltage comparator 142, a rectifier and a trigger capacitor module 144, and discharge feedback circuit 132.

Energy requirements of adaptive engine ignition system 100 are specified to ensure sufficient energy delivery at the igniter tip for all worst case starting scenarios. An environmental parameter affecting the required energy for successful combustion of fuel is a temperature of the fuel and/or temperature of the engine. Fuel vaporization is significantly reduced at cold temperature. Cold temperature starting tests indicate that delivered spark energy at cold temperature, for example, approximately (−55° C.) should be approximately 30%-40% higher than the delivered spark energy value that is sufficient for equivalent acceptable starting performance at room temperatures.

In addition to maintaining (or increasing) spark rate when storing higher energy for cold temperature conditions, embodiments of the present invention permit a reduced delivered energy and lower spark rate during room temperature or hot condition engine starting.

Embodiments of the present invention facilitate improving cold temperature operation of ignition exciter circuit 102. Specifically, energy stored in tank capacitors 112 is increased and the amount of power able to be processed by power converter 110 and transferred to tank capacitors 112 for energy storage is simultaneously increased. The increase in power conversion is required to ensure that the spark rate can be maintained during higher energy storage operation, as charging tank capacitors 112 to higher levels without increased power conversion would require additional time. The time to charge tank capacitors 112 is a limiting factor of a spark rate of ignition exciter circuit 102 therefore, without increasing the power developed by power converter 110, the additional energy storage would cause a significant reduction in spark rate. This is not preferable, as spark rate is also an important parameter contributing to good engine starting performance.

Increased energy storage is accomplished by increasing the reference voltage of second temperature adaptive voltage comparator 142 that monitors tank capacitors 112. This increase in reference voltage at cold temperature permits additional voltage (and thus energy) to be stored in the capacitor before the voltage comparator "triggers" ignition exciter circuit 102 to discharge the energy to firing tip 120. At room ambient temperatures and higher, the reference voltage is decreased to a lower nominal value, as less energy is typically required to start the engine at relatively higher temperatures. In the exemplary embodiment, A negative temperature coefficient (NTC) device 148 such as a thermistor develops the reference voltage for second temperature adaptive voltage comparator 142. Thermistor 148 provides a relatively large impedance at relatively cold ambient temperatures, and lower impedances at approximately room ambient and higher temperatures. Thermistor 148 permits the adaptive features required for the increased energy storage circuit. In an alternative embodiment, a temperature device having other than a NTC is used to generate the reference voltage.

Increased conversion energy from the voltage monitoring circuit and discharge switch module 114 is accomplished by increasing the reference voltage of first temperature adaptive voltage comparator 136 that monitors the current mode control that controls the level of power processed and delivered to tank capacitors 112. The increase in reference voltage at relatively cold temperature permits additional current (and thus power) to be generated during each flyback cycle before the voltage comparator "triggers" the main power switch off, and thus transfers the power to tank capacitors 112. This approach increases the power of each flyback cycle, and it takes many flyback cycles to completely charge the storage capacitor. At room ambient temperatures and higher, the reference voltage is decreased to a lower nominal value, as less power is required to charge the tank capacitor in these conditions. An NTC thermistor 146 generates the reference voltage. In various embodiments, operation of ignition exciter circuit 102 or components thereof are controlled at least partially by a processor 150 that may comprise a memory for storing instructions used for control of ignition exciter circuit 102 or such components.

The effective change over temperature of first temperature adaptive voltage comparator 136 and second temperature adaptive voltage comparator 142 is approximately matched to ensure that the performance of power converter 110 is sufficient to ensure increased energy storage at the appropriate charging rate of tank capacitor 112 for operation of ignition exciter circuit 102. In the exemplary embodiment, two identical NTC thermistors (one in each circuit) provide optimal matching between the power processing and energy storage circuits, although each of the voltage reference circuits is different due to the different type of signals being processed. As used herein, the term "identical" is used to convey the thermistor are substantially similar having characteristics that affect their ability to perform as described herein substantially similarly. A single device could be used to perform this same function with other circuit implementations. In addition, any device exhibiting voltage variation with temperature could also be used to implement these features. In addition to temperature, other parameters that may affect the performance of engine starting may also be monitored and compensated for using an appropriate sensor communicatively coupled to the respective adaptive comparator.

In an alternative embodiment, an increased sparking rate at cold temperatures without the increased stored energy is provided. The alternative embodiment supports higher sparking rates that can provide improved combustion in air turbulent combustors by improving the possibility of a spark occurring when the fuel is nearest the igniter tip. The alternative embodiment permits the use of the adaptive power conversion feature described above with a constant energy storage and delivery circuit such as those implemented with glass tube spark gaps, or non-adaptive solid-state discharge switch.

Known systems that employ high spark rate or increased energy modes via external control do not use a matched self-optimizing circuit feature to independently configure the power conversion and energy storage exciter circuits for optimal performance. The use of external control can further improve the level of performance or flexibility of the adaptive spark rate and stored energy by providing additional control of these features, or by adding enabling, disabling, or reporting and monitoring features to the overall engine control system.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 150, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is increased power conversion of an ignition energy storage system that permits increased energy storage before triggering an ignition spark event during cold temperature conditions (spark rate is maintained), and that maintains the energy storage level during the ignition spark event during cold temperature conditions such that a nominal delivered energy and spark rate acceptable for typical engine starting performance during room temperature or hot conditions is provided. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and systems for adaptive ignition provides a cost-effective and reliable means for adaptively providing a selectable spark rate and spark energy level in an engine ignition system for varying ambient conditions. More specifically, the methods and systems described herein facilitate improving engine-starting performance using an adaptive ignition exciter circuitry. In addition, the above-described methods and systems use a matched self-optimizing circuit feature to independently configure the power conversion and energy storage exciter circuits for optimal performance. As a result, the methods and systems described herein facilitate adaptively modifying ignition circuitry to provide a selectable spark rate and spark energy level in a cost-effective and reliable manner.

While the disclosure has been described in terms of various specific embodiments, it will be recognized that the disclosure can be practiced with modification within the spirit and scope of the claims.

What is claimed is:

1. A method of igniting fuel in a combustor of an engine using an igniter plug, said method comprising:
- determining at least one of an environmental and an operational parameter of the engine;
- controlling an amount of energy stored in an energy storage device using the determined parameter of the engine;
- controlling a shape and a timing of a stored energy waveform channeled from said energy storage device to the igniter plug using a pulse forming network; and
- outputting a spark impulse to the igniter plug to generate a spark.

2. A method in accordance with claim 1 wherein controlling an amount of energy stored in an energy storage device using the determined parameter of the engine comprises:
- controlling a reference voltage of a first adaptive comparator using the at least one of an environmental and an operational parameter of the engine; and
- comparing the reference voltage to a voltage of the energy storage device.

3. A method in accordance with claim 1, further comprising controlling a spark rate delivered to the igniter plug using the determined parameter of the engine.

4. A method in accordance with claim 1 wherein controlling an amount of energy stored in an energy storage device using the determined parameter of the engine comprises comparing a first input of a first comparator representing at least one of an ambient temperature proximate the engine and a process temperature of the engine to a second input of the first comparator representing an amount of energy stored in the energy storage device.

5. A method in accordance with claim 4 further comprising controlling a spark rate delivered to the igniter plug wherein the method comprises comparing a first input of a second comparator representing at least one of an ambient temperature proximate the engine and a process temperature of the engine to a second input of the comparator representing an amount of power processed and delivered to the igniter plug.

6. A method in accordance with claim 5 wherein controlling an amount of energy stored in an energy storage device and controlling a spark rate delivered to the igniter plug comprises controlling an effective change over temperature of the first comparator and the second comparator is approximately matched.

7. A method in accordance with claim 6 wherein determining at least one of an environmental and an operational parameter of the engine comprises transmitting an output of a first temperature sensor to the first input of the first comparator and transmitting an output of a second temperature sensor to the first input of the second comparator.

8. A method in accordance with claim 6 wherein determining at least one of an environmental and an operational parameter of the engine comprises transmitting an output of a first temperature sensor to the first input of the first comparator and to the first input of the second comparator.

9. A method in accordance with claim 3, wherein controlling a spark rate delivered to the igniter plug using the determined parameter of the engine comprises:

controlling a reference voltage of a second adaptive comparator using the at least one of an environmental and an operational parameter of the engine; and comparing the reference voltage to a voltage of discharge switch that controls an amount of power processed and delivered to the igniter plug.

* * * * *